United States Patent
Wang et al.

(10) Patent No.: US 10,906,538 B2
(45) Date of Patent: Feb. 2, 2021

(54) DRIVING ASSISTANCE METHOD, DRIVING ASSISTANCE DEVICE, AND VEHICLE HAVING DRIVING ASSISTANCE DEVICE

(71) Applicant: BOE TECHNOLOGY GROUP CO., LTD., Beijing (CN)

(72) Inventors: Shu Wang, Beijing (CN); Huawei Yu, Beijing (CN); Wei Deng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/938,474

(22) Filed: Mar. 28, 2018

(65) Prior Publication Data

US 2019/0061752 A1 Feb. 28, 2019

(30) Foreign Application Priority Data

Aug. 31, 2017 (CN) .......................... 2017 1 0771450

(51) Int. Cl.
| | |
|---|---|
| *B60W 30/10* | (2006.01) |
| *G06K 9/00* | (2006.01) |
| *B60W 40/06* | (2012.01) |
| *B60W 50/14* | (2020.01) |

(52) U.S. Cl.
CPC ............ *B60W 30/10* (2013.01); *B60W 40/06* (2013.01); *B60W 50/14* (2013.01); *G06K 9/00798* (2013.01); *G06K 9/00805* (2013.01); *B60W 2050/143* (2013.01); *B60W 2050/146* (2013.01); *B60W 2552/20* (2020.02)

(58) Field of Classification Search
CPC ............. G06K 9/00798; G06K 9/4638; H04N 13/0239; H04N 13/239; H04N 7/183
See application file for complete search history.

(56) References Cited

U.S. PATENT DOCUMENTS

| | | | |
|---|---|---|---|
| 2010/0238283 A1 | 9/2010 | Kim | |
| 2013/0163821 A1* | 6/2013 | You | ..................... G06K 9/00798 |
| | | | 382/104 |

(Continued)

FOREIGN PATENT DOCUMENTS

| | | |
|---|---|---|
| CN | 101837780 A | 9/2010 |
| CN | 102156979 A | 8/2011 |

(Continued)

OTHER PUBLICATIONS

First Office Action dated Jun. 28, 2019; Corresponding to Chinese Application No. 201710771450.4; English Translation Attached.

*Primary Examiner* — Hai Phan
*Assistant Examiner* — Anthony D Afrifa-Kyei
(74) *Attorney, Agent, or Firm* — Nath, Goldberg & Meyer; Joshua B. Goldberg

(57) ABSTRACT

Disclosed is a driving assistance method, comprising: periodically capturing an image in front of a vehicle; obtaining fitting points on each of edges of a road in the image; generating a virtual boundary on the basis of the obtained fitting points; and generating at least one virtual lane line between two virtual boundaries of the road. With the driving assistance method, the road without lane division can be divided into lanes to improve traffic safety. The present disclosure also provides a driving assistance device and a vehicle having the same.

12 Claims, 4 Drawing Sheets

(56) References Cited

U.S. PATENT DOCUMENTS

| | | | | |
|---|---|---|---|---|
| 2014/0236482 A1* | 8/2014 | Dorum | ................... | G01C 21/34 |
| | | | | 701/533 |
| 2014/0244153 A1* | 8/2014 | Dorum | ............... | G01C 21/3632 |
| | | | | 701/409 |
| 2018/0165822 A1* | 6/2018 | Uliyar | ................ | G06K 9/00798 |
| 2018/0165833 A1* | 6/2018 | Inoue | ........................ | G06T 3/00 |
| 2018/0247138 A1* | 8/2018 | Kang | ................... | G05D 1/0231 |

FOREIGN PATENT DOCUMENTS

| | | |
|---|---|---|
| CN | 102910126 A | 2/2013 |
| CN | 103177246 A | 6/2013 |
| CN | 103310202 A | 9/2013 |
| CN | 105922991 A | 9/2016 |
| CN | 106364403 A | 2/2017 |
| CN | 106529505 A | 3/2017 |
| CN | 106682646 A | 5/2017 |

\* cited by examiner

DRIVING ASSISTANCE METHOD, DRIVING ASSISTANCE DEVICE, AND VEHICLE HAVING DRIVING ASSISTANCE DEVICE

CROSS-REFERENCE TO RELATED APPLICATION

This application claims the priority of China Patent Application No. 201710771450.4, filed on Aug. 31, 2017, which is hereby incorporated by reference herein in its entirety.

FIELD

The present disclosure relates to the field of vehicles, and in particular, to a driving assistance method, a driving assistance device for executing the driving assistance method, and a vehicle having the driving assistance device.

BACKGROUND

There is no lane division for many roads (e.g., country roads), which increases the danger of vehicles travelling on these roads. However, the rebuilding the roads to make the lane division thereon could be a huge projection and cannot be completed in a very short period of time. Therefore, how to reduce the risk of driving on the road without lanes has become a technical problem to be solved in the related art.

SUMMARY

The present disclosure is to provide a driving assistance method, a driving assistance device for executing the driving assistance method and a vehicle having the driving assistance device.

As the first aspect of the disclosure, there is provided a driving assistance method, comprising steps of: periodically capturing an image in front of a vehicle; obtaining fitting points on each of edges of a road in the image; generating a virtual boundary on the basis of the obtained fitting points; and generating at least one virtual lane line between two virtual boundaries of the road.

In an exemplary embodiment of the disclosure, the step of obtaining fitting points on each of edges of the road in the image comprises: dividing the image into a plurality of sub-images in a height direction of the image; and obtaining a plurality of fitting points on each of edges of the road in each sub-image. The driving assistance method further comprises: starting a next period, after the vehicle passes the sub-image in the bottommost portion of the image captured in the current period.

In an exemplary embodiment of the disclosure, the fitting points in each of sub-images in any one period comprise the fitting points in the sub-images representing the same geographical absolute position in the previous period.

In an exemplary embodiment of the disclosure, the number of fitting points obtained in each of the sub-images in a same period is inversely related to a height of the sub-image in the image.

In an exemplary embodiment of the disclosure, the step of generating a virtual boundary on the basis of the obtained fitting points comprises: generating a fitting curve based on the fitting points on each of the edges of the road in each of the sub-images; and displacing the fitting curve to an innermost one of the fitting points for generating the fitting curve on the road to obtain the virtual boundary.

In an exemplary embodiment of the disclosure, the virtual lane line comprises a virtual midline between two virtual boundaries to divide the road into two lanes having the same width.

In an exemplary embodiment of the disclosure, the driving assistance method further comprises: judging whether the vehicle exceeds the virtual midline; and generating an alarm signal when the vehicle exceeds the virtual midline.

As the second aspect of the disclosure, there is provided a driving assistance device, comprising: an image capture circuit, configured to periodically capture an image in front of a vehicle; a fitting point obtaining circuit, configured to obtain fitting points on each of edges of a road in the image; a virtual boundary generation circuit, configured to generate a virtual boundary on the basis of the obtained fitting points; and a virtual lane generation circuit, configured to generate at least one virtual lane line between two virtual boundaries of the road.

In an exemplary embodiment of the disclosure, the driving assistance device further comprises a controller and an image dividing circuit, wherein the image dividing circuit is configured to divide the image into a plurality of sub-images in a height direction of the image; the fitting point obtaining circuit is further configured to obtain a plurality of fitting points on each of edges of the road in each sub-image: and the controller is configured to send a start control signal to the image capture circuit after the vehicle passes the sub-image in the bottommost portion of the image to control the image capture circuit to re-capture an image.

In an exemplary embodiment of the disclosure, the fitting points in each of sub-images in any one period determined by the fitting point obtaining circuit comprise the fitting points in the sub-image representing the same position in the previous period.

In an exemplary embodiment of the disclosure, the number of fitting points obtained in each of the sub-images is inversely related to the height of the sub-image in the image in one period.

In an exemplary embodiment of the disclosure, the virtual boundary generation circuit comprises a curve fitting unit and a virtual boundary generating unit, wherein the curve fitting unit is configured to generate a fitting curve based on the fitting points on each of the edges of the road in each of sub-images; and the virtual boundary generating unit is configured to displace the fitting curve to an innermost one of the fitting points on the road to obtain the virtual boundary.

In an exemplary embodiment of the disclosure, the virtual lane line comprises a virtual midline between two virtual boundaries to divide the road into two lanes having the same width.

In an exemplary embodiment of the disclosure, the driving assistance device further comprises a judgment circuit and an alarm generation circuit, wherein the judgment circuit is configured to judge whether the vehicle exceeds the virtual midline; and the alarm generation circuit is configured to generate an alarm signal when the vehicle exceeds the virtual midline.

In an exemplary embodiment of the disclosure, the driving assistance device comprises a display device configured to display the virtual boundary and the virtual lane line.

As the third aspect of the disclosure, there is provided a vehicle comprising a driving assistance device, wherein the driving assistance device comprises: an image capture circuit, configured to periodically capture an image in front of a vehicle; a fitting point obtaining circuit, configured to obtain fitting points on each of edges of a road in the image;

a virtual boundary generation circuit, configured to generate a virtual boundary on the basis of the obtained fitting point; and a virtual lane generation circuit, configured to generate at least one virtual lane line between two virtual boundaries of the road.

BRIEF DESCRIPTION OF THE DRAWINGS

The accompanying drawings, which are included to provide a further understanding of the disclosure and to constitute a part of the specification, are used in conjunction with the following embodiments to explain the disclosure, and do not constitute a limitation to the disclosure. In the drawings.

DETAILED DESCRIPTION

The embodiments of the present disclosure will be described in detail hereinafter with reference to the accompanying drawings. It should be understood that the embodiments described herein are only provided for the description and explanation of the disclosure and not intended to limit the disclosure.

Figure 1:
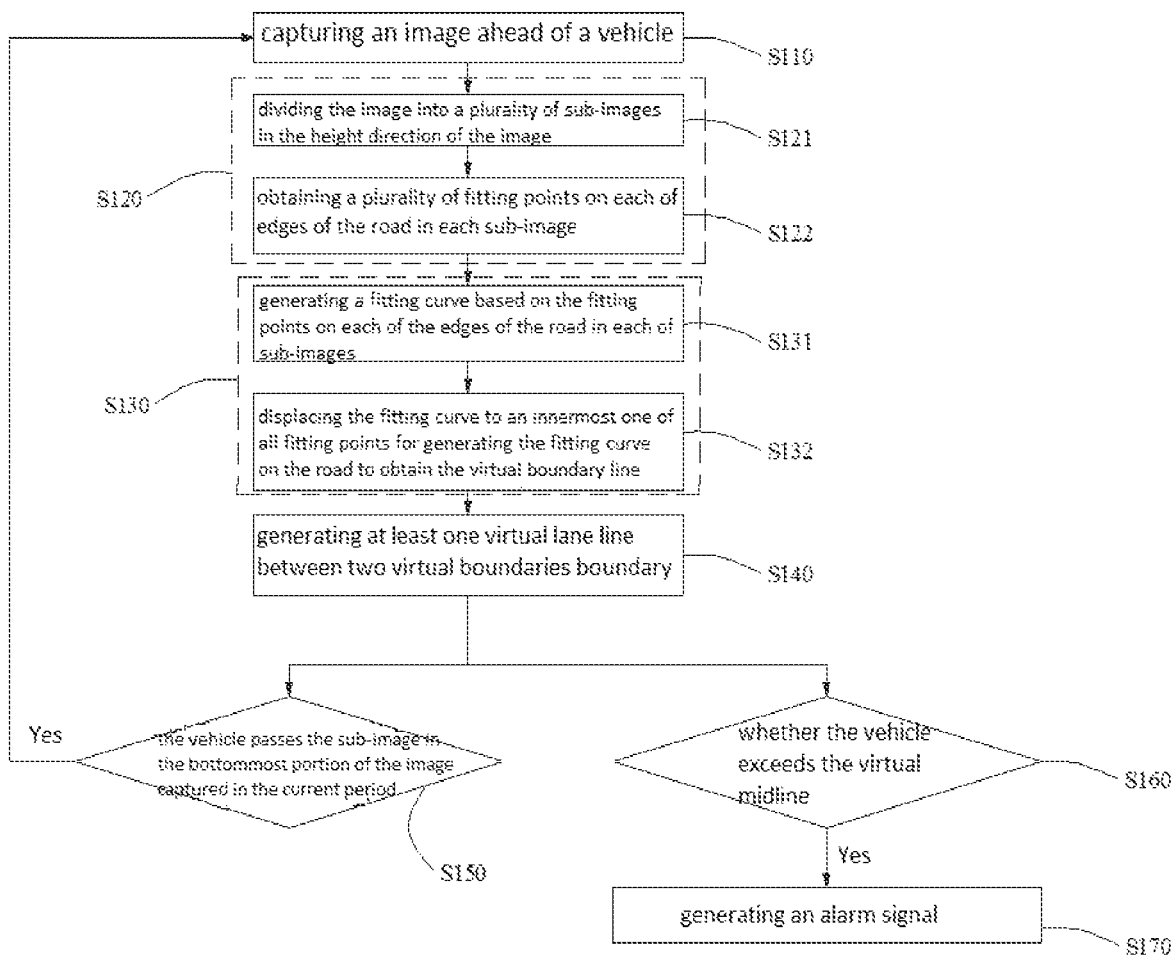
FIG. 1 is a flowchart of a driving assistance method according to the present disclosure.

As one aspect of the present disclosure, there is provided a driving assistance method. As shown in FIG. 1, the driving assistance method comprises steps of:

Step S110, periodically capturing an image in front of a vehicle;

Step S120, obtaining fitting points on each of edges of a road in the image;

Step S130, generating a virtual boundary on the basis of the obtained fitting points; and Step S140, generating at least one virtual lane line between two virtual boundaries of the road.

In the driving assistance method according to the present disclosure, the actual traffic information can be obtained by using the image in front of the vehicle, and the virtual boundary can be generated based on the actual traffic information. Each edge of the road corresponds to a virtual boundary. Therefore, a part between the two virtual boundaries is a virtual road. When the virtual lane is defined on the virtual road, a driver can drive within the divided virtual lane, so as to avoid occupying the lane of vehicles driving in the opposite direction and improve traffic safety.

In the present disclosure, since the fitting points are obtained from each of edges of the road, the virtual boundary should not deviate much far from the real edge of the road. Therefore, the virtual road obtained is very close to the real road condition. The virtual lanes based on the division of the virtual road are also more in line with the real road condition.

Since the driving assistance method includes a plurality of periods, when a direction of a road is changed, lane division can be timely performed in time on the changed road, so that traffic safety can be further improved.

In order to bring the generated virtual road boundary closer to the edge of the actual road and to divide the road into lanes according to real-time traffic information, in an exemplary embodiment of the present disclosure, step S120 may comprise steps of:

Step S121, dividing the image into a plurality of sub-images in the height direction of the image; and Step S122, obtaining a plurality of fitting points on each of edges of road in each sub-image.

The driving assistance method further comprises steps of:

Step S150, closing the current period to start a next period, after the vehicle passes the sub-image in the bottommost portion of the image captured in the current period.

According to this embodiment, fitting points are obtained on each sub-image, such that the finally generated virtual boundaries can be closer to the actual edges of the road.

Through step S150, it can be ensured that a reasonable virtual one line is obtained in real time.

Figure 4:
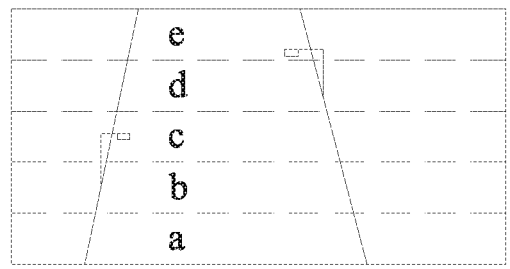
FIG. 4 is a schematic diagram of a division of an image in a previous period.
Figure 5:
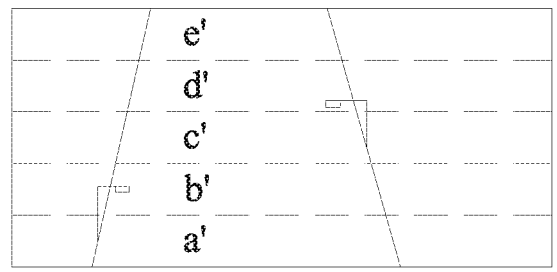
FIG. 5 is a schematic diagram of a division of an image in a next period.

The "height direction of the image" described herein refers to an up-and-down direction in FIGS. 4 and 5. In one example, the acquired image can include a pixel array composed of a plurality of pixel units. In the pixel array, a plurality of pixel units can be arranged in a plurality of rows and columns. Here, the "height direction of the image" refers to a column direction of the pixel array. It can be readily understood that an absolutely geographical absolute position represented by a sub-image in a lower portion of the image is closer to a vehicle, and an absolutely geographical absolute position represented by a sub-image in a higher portion of the image is farther away from the vehicle.

In the present disclosure, only one image is obtained in one period. The "sub-image in the bottommost portion of an image" herein refers to the sub-image at the lowest portion in FIGS. 4 and 5. In other words, the geographical absolute position represented by the sub-image in the bottommost portion of the image is the closest to the vehicle.

In the next period, for example, the fitting points can be retrieved on the road edges in each sub-image. In order to make the virtual boundaries obtained by fitting closer to the road edges in actual road conditions, in an exemplary embodiment of the present disclosure, the fitting points in each of sub-images in any one period include the fitting points in the sub-images representing the same geographical absolute position in the previous period.

It should be noted that there is a geographical absolute position for any position. For example, the geographical absolute position can be represented by latitude and longitude.

If the absolute position of a road segment represented in a sub-image in any period is the same as the absolute position of a road segment represented in a sub-image in the next period, the two sub-images will be considered to represent the same position.

FIGS. 4 and 5 are schematic diagrams showing images obtained during two adjacent periods. Herein, FIG. 4 shows the image captured in the current period, while FIG. 5 shows the image captured in the following period. The position represented by a sub-image b in FIG. 4 is the same as the position represented by a sub-image a' in FIG. 5; the position represented by a sub-image c in FIG. 4 is the same as the position represented by a sub-image b' in FIG. 5; the position represented by a sub-image d in FIG. 4 is the same as the position represented by a sub-image c' in FIG. 5; and the position represented by a sub-image e in FIG. 4 is the same as the position represented by a sub image e' in FIG. 5.

In order to reduce the amount of computation and improve the fitting accuracy, in an exemplary embodiment of the present disclosure, the number of fitting points obtained in each of the sub-images is inversely related to a height of the sub-image in the image. In other words, an upper sub-image in the image indicates that a road segment in the sub-image is farther away from the vehicle, while a lower sub-image in the image indicates that the road segment in the sub-image is closer to the vehicle. The resulted virtual boundaries become closer to the edge of the road in the image as the fitting points in the sub-image are increased, or vice versa. In the driving assistance method according to the present disclosure, it is possible to ensure accurate simulation of the closest portion of road edge to the vehicle, so that the accuracy of the virtual lane division can be improved while the amount of computation is reduced.

In the present disclosure, no special regulation is made on the determination of the number of fitting points in each sub-image. For example, as one embodiment, the number of fitting points in each sub-image satisfies with an arithmetic progression.

As one embodiment, in the sub-image, the number of fitting points on each edge of the road satisfies with the following formula:

$a_{n+1}=a_n-15$, where $a_n$ is the number of fitting points on each edge of the road in the n-th sub-image, and $a_{n+1}$ is the number of fitting points on each edge of the road in the (n+1)-th sub-image. Herein, $a_1$ is the number of fitting points in the sub-image located at the bottom of the image.

As a specific embodiment, the image may be divided into five sub-images, and 110 fitting points are selected for each edge of the road in the image. In one example, in a bottom-to-top order, 50 fitting points are selected for each edge of the road in the sub-image located at the bottom of the image: 35 fitting points are selected for each edge of the road in the second sub-image; 20 fitting points are selected for each edge of the road in the third sub-image; 5 fitting points are selected for each edge of the road in the fourth sub-image; and 0 fitting points are selected in the top sub-image.

In the present disclosure, as an exemplary embodiment, step S130 may comprise:

Step S131, generating a fitting curve based on the fitting points on each of the edges of the road in each of sub-images; and Step S132, displacing the fitting curve to an innermost one of the fitting points for generating the fitting curve on the road to obtain the virtual boundary.

In the present disclosure, it is possible to prevent the vehicle from running excessively close to the edge of the real road, thereby improving driving safety.

Figure 2:
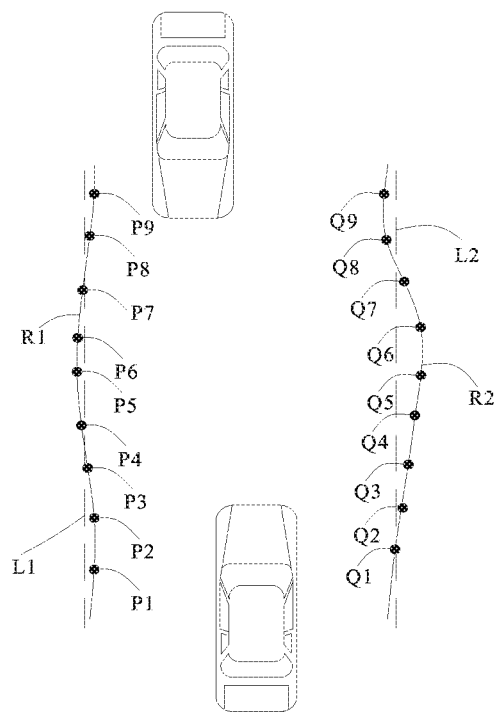
FIG. 2 is a schematic diagram of obtaining a fitting curve by the use of fitting points.
Figure 3:
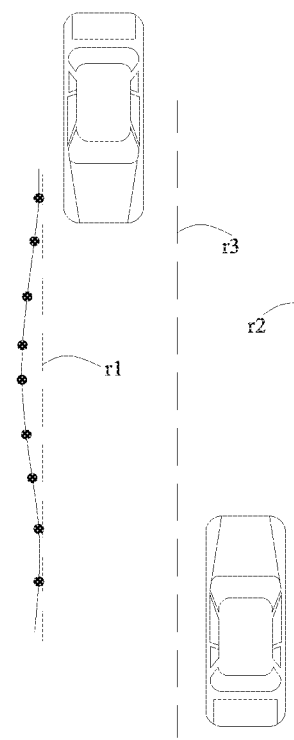
FIG. 3 is a schematic diagram of the generation of a virtual lane using the driving assistance method according to the present disclosure.

As shown in FIG. 2, a fitting point P1, a fitting point P2, a fitting point P3, a fitting point P4, a fitting point P5, a fitting point P6, a fitting point P7, a fitting point P8 and a fitting point P9 are obtained on an edge R1 of a road. A fitting curve L1 is generated using an algorithm (e.g., using the same algorithm as the one in excel or origin to generate the fitting curve), and then the fitting curve L1 is displaced to an innermost one of the fitting points on the edge R1 of the road, so that the virtual boundary r1 in FIG. 3 can be obtained.

Similarly, a fitting point Q1, a fitting point Q2, a fitting point Q3, a fitting point Q4, a fitting point Q5, a fitting point Q6, a fitting point Q7, a fitting point Q8 and a fitting point Q9 are obtained on the other edge R2 of the road. A fitting curve L2 is generated using an algorithm (e.g., using the same algorithm as the one in excel or origin to generate the fitting curve), and then the fitting curve L2 is displaced to an innermost one of the fitting points on the edge R2 of the road, so that the virtual boundary r2 in FIG. 3 can be obtained.

Figure 6:
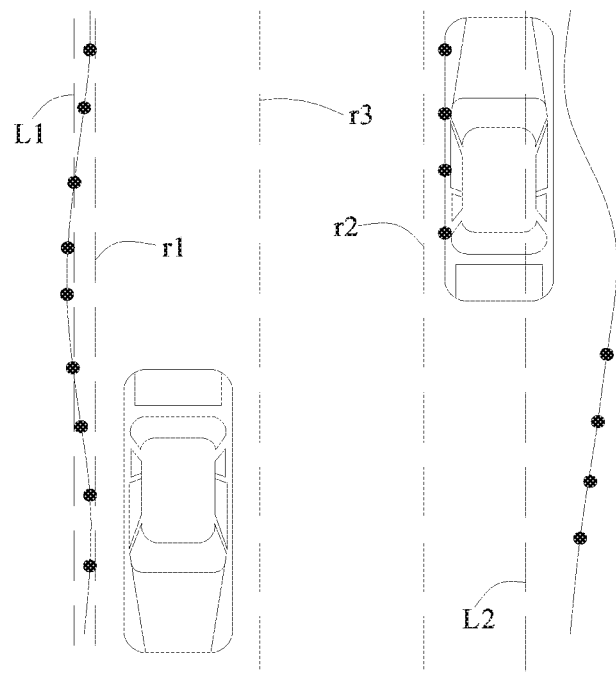
FIG. 6 is a schematic diagram showing the generation of a virtual lane using the driving assistance method according to the present disclosure in the presence of an obstacle on a road.

Due to the complexity of the real road conditions, obstacles often appear on the road. The method according to the present disclosure is also applicable to the case where there is an obstacle on the road. For example, as shown in FIG. 6, a vehicle may be parked by the edge of the road (the vehicle parked on a side of the road may be regarded as an obstacle). When the virtual boundary r2 is generated, some of captured fitting points are located at the edge of the road and the rest at the edge of the obstacle. Similarly, after the fitting curve L2 is generated, the fitting curve L2 is displaced to an inside of road with respect with the obstacle to obtain the virtual boundary r2.

In the present disclosure, the number of virtual lanes is not particularly limited. For example, the road can divide into two virtual lanes. In one example, a virtual midline r3 may be disposed in the middle position of two virtual boundaries to divide the road into two lanes having the same width.

In order to improve the travelling safety of vehicles, in an exemplary embodiment of the present disclosure, the driving assistance method further comprises:

Step S150, judging whether the vehicle exceeds the virtual midline; and

Step S160, generating an alarm signal when the vehicle exceeds the virtual midline.

In the present disclosure, for example, step S150 may be performed immediately following the generation of the virtual lane, or step S160 may be performed when the presence of a meeting vehicle is detected.

After receiving the alarm signal, the driver may adjust the direction of the vehicle to avoid an accident when meeting the vehicle.

In the present disclosure, for example, the alarm signal may be an audio signal, an optical signal, or a combination thereof.

For example, an indicator light may be provided on the dashboard of the vehicle. When the vehicle exceeds the virtual midline, a control signal can be generated, to control the emission of the corresponding indicator light.

Alternatively, a speaker may be arranged on the dashboard of the vehicle. When the vehicle exceeds the virtual midline, a control signal can be generated, to control the speaker to sound a warning tone.

Of course, it is also possible to provide both the indicator light and the speaker on the dashboard of the vehicle. When the vehicle exceeds the virtual midline, both audible and visual signals can be simultaneously emitted to more efficiently warn the driver.

Figure 7:
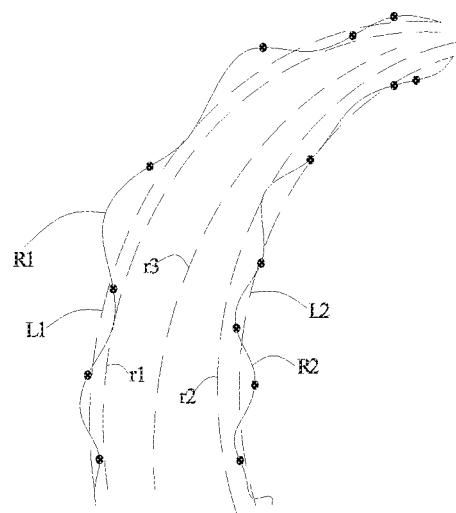
FIG. 7 is a schematic diagram showing the generation of a virtual lane using the driving assistance method according to the present disclosure in the presence of a curved road.

When the road on which the vehicle is driving is a tortuous road shown in FIG. 7, after the fitting points of the road edge in the image are obtained, it is also necessary to determine specific locations of the fitting points (at the inner side or the outer side of the tortuous road). For example, it is possible to judge whether the fitting points are located on the inner side or outer side of the tortuous road in the following manners.

Figure 8:
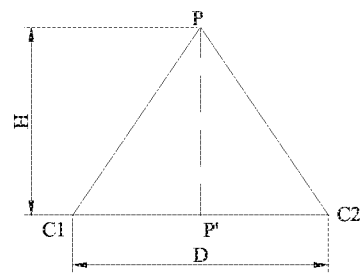
FIG. 8 is a diagram showing a positional relation among a reference point, a fitting point and a mapping point.

In a manner, an image in front of the vehicle is captured using two cameras on both sides of the vehicle. Therefore, the lower left corner of the image and the lower right corner of the image can be considered as two camera positions. As shown in FIG. 8, the lower left corner and the lower right corner of the image are connected with a fitting point to form a triangle, and then a perpendicular line from the fitting point is extended to the bottom of the image. Based on an angle $\theta 1$ formed between a connection line of a reference point C1 at the lower left corner of the image with a fitting point P and the bottom side of the image, an angle $\theta 2$ formed between a connection line of a reference point C2 at the lower right corner of the image with the fitting point P and the bottom side, and a distance D between the reference point C1 at the lower left corner of the image and the reference point C2 at the lower right corner of the image, a distance H between the fitted point and the bottom side of the image can be calculated. By comparing the distances H from the fitting points to the bottom side and the positions of mapping points of the fitting points on the bottom side of the image, it can be determined whether fitting points are located on the inner side or the outer side of the road. When the positions of the mapping points of two fitting points on the bottom side of the image are the same, the one of the two fitting points that has a longer distance H from the bottom side is located on the outer side of the road, and the other one of the fitting points is located on the inner side of the road.

Figure 9:
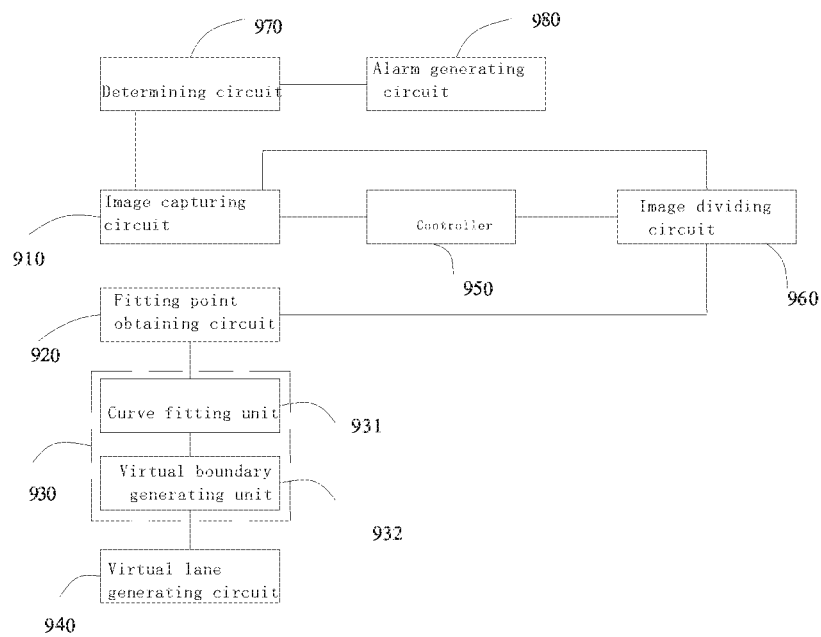
FIG. 9 is a schematic diagram of a driving assistance device according to the present disclosure.

As a second aspect of the present disclosure, a driving assistance device is provided for completing the above-described driving assistance method according to the present disclosure. As shown in FIG. 9, the driving assistance device includes an image capture circuit 910, a fitting point obtaining circuit 920, a virtual boundary generation circuit 930, and a virtual lane generation circuit 940.

The image capture circuit 910 is configured to periodically capture an image in front of a vehicle.

The fitting point obtaining circuit 920 is configured to obtain fitting points on each of edges of a road in the image.

The virtual boundary generation circuit 930 is configured to generate a virtual boundary on the basis of the obtained fitting points.

The virtual lane generation circuit 940 is configured to generate at least one virtual lane line between two virtual boundaries of the road.

In the present disclosure, for example, the image capture circuit 910 may include cameras mounted on both sides of the vehicle such that an image in front of the vehicle can be captured. The driving assistance device according to the present disclosure is used to execute the above-described driving assistance method according to the present disclosure, and thus it is possible to achieve the same effect as the driving assistance method.

In order to obtain real-time traffic information, in an exemplary embodiment of the present disclosure, the image capture circuit 910 is configured to periodically capture the image. Correspondingly, the driving assistance device further comprises a controller 950 and an image dividing circuit 960.

The image dividing circuit 960 is configured to divide the image into a plurality of sub-images in a height direction of the image.

Correspondingly, the fitting point obtaining circuit 920 is further configured to obtain a plurality of fitting points on each of edges of the road in each sub-image.

The controller 950 is configured to send a start control signal to the image capture circuit after the vehicle passes the sub-image in the bottommost portion of the image, to control the image capture circuit 910 to re-capture an image.

In an exemplary embodiment of the present disclosure, the fitting points in each of sub-images in any one period determined by the fitting point obtaining circuit 920 include the fitting points in the sub-image representing the same geographical absolute position in the previous period.

As described above, the number of fitting points obtained in each of the sub-images is inversely related to a height of the sub-image in the image in one period.

In an exemplary embodiment of the present disclosure, the virtual boundary generation circuit 930 includes a curve fitting unit 931 and a virtual boundary generating unit 932.

The curve fitting unit 931 is configured to generate a fitting curve based on the fitting points on each of the edges of the road in each of sub-images.

The virtual boundary generating unit 932 is configured to displace the fitting curve to an innermost one of the fitting points on the road to obtain the virtual boundary.

In an exemplary embodiment of the present disclosure, the driving assistance device is also applicable to the case where there is an obstacle on the road.

In one example, when the fitting points obtained by the fitting point obtaining circuit 920 are located over the obstacle, the curve fitting unit 931 can generate a fitting curve by using the fitting points on the obstacle. The virtual boundary generating unit 932 can displace the fitting curve to an inside of road with respect with the obstacle to obtain the virtual boundary.

As described above, as an embodiment of the present disclosure, the virtual lane line includes a virtual midline between two virtual boundaries to divide the road into two lanes having the same width.

In an exemplary embodiment of the present disclosure, the driving assistance device further includes a judgment circuit 970 and an alarm generation circuit 980.

The judgment circuit 970 is configured to judge whether the vehicle exceeds the virtual midline.

The alarm generation circuit 980 is configured to generate an alarm signal when the vehicle exceeds the virtual midline.

As an embodiment, the driving assistance device includes a display device configured to display the virtual boundary and the virtual lane line.

Of course, the driving assistance device may not include the display device. Alternatively, the existing display device of the vehicle may be used to display the virtual boundary and the virtual lane line.

As the third aspect of the present disclosure, there is provided a vehicle comprising a driving assistance device, wherein the driving assistance device is any one of the above-described driving assistance devices according to the present disclosure.

Since the driving assistance device can perform lane division on a road without driving lanes by using the above-mentioned driving assistance method according to the present disclosure, the travelling safety of a driver driving the vehicle can be improved.

It can be understood that the above embodiments are merely exemplary embodiments provided for the illustration of the principle of the present disclosure. However, the disclosure is not limited thereto. For those ordinarily skilled in the art, various modifications and improvements may be made without departing from the spirit and essence of the present disclosure, and these modifications and improvements are also considered as falling into the protection scope of the present disclosure.

What is claimed is:

1. A driving assistance method for lane division, comprising steps of:
   periodically capturing an image in front of a vehicle;
   obtaining fitting points on each of edges of a road in the image;
   generating a virtual boundary on the basis of the obtained fitting points; and
   generating at least one virtual lane line between two virtual boundaries of the road, the at least one virtual lane line including a virtual midline between two virtual boundaries to divide the road into two lanes having the same width,
   wherein the step of obtaining fitting points on each of edges of a road in the image comprises:
   dividing the image into a plurality of sub-images in a height direction of the image; and
   obtaining a plurality of fitting points on each of edges of the road in each sub-image, and
   wherein the step of generating a virtual boundary on the basis of the obtained fitting points comprises:
   generating a fitting curve based on the fitting points on each of the edges of the road in each of sub-images; and
   displacing the fitting curve to an innermost one of the fitting points for generating the fitting curve on the road to obtain the virtual boundary.

2. The driving assistance method according to claim 1, wherein
   the driving assistance method further comprises:
   starting a next period, after the vehicle passes the sub-image in the bottommost portion of the image captured in the current period.

3. The driving assistance method according to claim 2, wherein the fitting points in each of sub-images in any one period comprise the fitting points in the sub-images representing the same geographical absolute position in the previous period.

4. The driving assistance method according to claim 1, wherein the number of fitting points obtained in each of the sub-images is inversely related to a height of the sub-image in the image.

5. The driving assistance method according to claim 1, further comprising:
   judging whether the vehicle exceeds the virtual midline; and
   generating an alarm signal when the vehicle exceeds the virtual midline.

6. A driving assistance device for lane division, comprising:
   an image capture circuit, configured to periodically capture an image in front of a vehicle;
   a fitting point obtaining circuit, configured to obtain fitting points on each of edges of a road in the image;
   a virtual boundary generation circuit, configured to generate a virtual boundary on the basis of the obtained fitting point; and
   a virtual lane generation circuit, configured to generate at least one virtual lane line between two virtual boundaries of the road, the at least one virtual lane line including a virtual midline between two virtual boundaries to divide the road into two lanes having the same width,
   wherein the driving assistance device further comprises an image dividing circuit configured to divide the image into a plurality of sub-images in a height direction of the image, and
   the fitting point obtaining circuit is further configured to obtain a plurality of fitting points on each of edges of the road in each sub-image, and
   wherein the virtual boundary generation circuit includes a curve fitting unit configured to generate a fitting curve based on the fitting points on each of the edges of the road in each of sub-images; and a virtual boundary generating unit configured to displace the fitting curve to an innermost one of the fitting points on the road to obtain the virtual boundary.

7. The driving assistance device according to claim 6, wherein the driving assistance device further comprises a controller configured to send a start control signal to the image capture circuit after the vehicle passes the sub-image in the bottommost portion of the image to control the image capture circuit to re-capture an image.

8. The driving assistance device according to claim 6, wherein the fitting points in each of sub-images in any one period determined by the fitting point obtaining circuit comprise the fitting points in the sub-image representing the same geographical absolute position in the previous period.

9. The driving assistance device according to claim 6, wherein the number of fitting points obtained in each of the sub-images is inversely related to a height of the sub-image in the image in one period.

10. The driving assistance device according to claim 6, wherein the driving assistance device further comprises a judgment circuit and an alarm generation circuit, and wherein
    the judgment circuit is configured to judge whether the vehicle exceeds the virtual midline; and
    the alarm generation circuit is configured to generate an alarm signal when the vehicle exceeds the virtual midline.

11. The driving assistance device according to claim 6, wherein the driving assistance device comprises a display device for displaying the virtual boundary and the virtual lane line.

12. A vehicle comprising a driving assistance device for lane division, wherein the driving assistance device comprises:
    an image capture circuit, configured to periodically capture an image in front of a vehicle;
    a fitting point obtaining circuit, configured to obtain fitting points on each of edges of a road in the image;
    a virtual boundary generation circuit, configured to generate a virtual boundary on the basis of the obtained fitting point; and
    a virtual lane generation circuit, configured to generate at least one virtual lane line between two virtual boundaries of the road, the at least one virtual lane line including a virtual midline between two virtual boundaries to divide the road into two lanes having the same width,
    wherein the driving assistance device further comprises an image dividing circuit configured to divide the image into a plurality of sub-images in a height direction of the image, and
    the fitting point obtaining circuit is further configured to obtain a plurality of fitting points on each of edges of the road in each sub-image, and
    wherein the virtual boundary generation circuit includes a curve fitting unit configured to generate a fitting curve based on the fitting points on each of the edges of the road in each of sub-images; and a virtual boundary generating unit configured to displace the fitting curve to an innermost one of the fitting points on the road to obtain the virtual boundary.

* * * * *